United States Patent Office 2,887,728
Patented May 26, 1959

2,887,728

METHOD OF CENTRIFUGALLY CASTING A PIPE USING THERMOPLASTIC AND THERMOSETTING RESINS

Ernest M. Usab, Gardena, Calif., assignor to Reflin Co., Gardena, Calif., a corporation of California No Drawing. Application May 14, 1954
Serial No. 429,962

11 Claims. (Cl. 18—58.3)

This invention relates to the casting of reinforced plastic pipe.

It has now become feasible to produce plastic pipe of the larger dimensions, such as 4-inch to 8-inch pipe, from thermosetting resins, frequently referred to as plastics, and to reinforce such pipe with fabric sheets or the like such as woven sheets or matted sheets produced from fine glass-like filaments such as that commonly referred to as fiber glass sheets or mats, and marketed in one instance as Fiberglas.

However, it has been found very desirable to provide on the inner surface of such reinforced plastic cast pipe a tough lining which is somewhat soft and yieldable as compared with the main thickness of the pipe wall and which will not crack during use to produce objectionable cracked inner walls.

It is therefore an object of this invention to carry out a process for casting a plastic composition, for the indicated purpose, to produce cast plastic pipe which yields a permanently tough non-crackable inner wall surface and a relatively harder and more rigid outer wall and main body of plastic construction.

It is also an object of the invention to produce cast plastic pipe which is more desirable and more useful for the various purposes to which such pipe is adapted.

According to one procedure for producing cast plastic pipe, centrifugal casting is employed, that is the plastic and the reinforcing fabric are introduced into a tubular shell or mold which is then spun about its axis to distribute the plastic in fluid form evenly about the inner surface of the tube, the thermosetting plastic used being cured by application of heat, as from the mold, during centrifuging.

To produce satisfactory cast pipe in accordance with this invention I have discovered that it is desirable to produce the main body of the pipe, including its outer surface, from thermosetting plastic and to have a thermoplastic material on the inner wall to maintain such inner wall tough and non-crazing. But, thermoplastic resins and thermosetting resins of the types used in production of plastic articles are not in themselves properly compatible and, if merely mixed, do not distribute properly during centrifugal casting to provide the required inner thermoplastic lining and insure a satisfactory bond between the body of the pipe and the inner lining layer.

It being important to insure against separation of the thermosetting and thermoplastic constituents, it is therefore an object of this invention to avoid such separation, and, consequently, one phase of the invention exists in the described dispersion or suspension of the two constituents of different specific gravities.

Inasmuch as it is also important that the main body of the pipe and the outer wall thereof be of thermosetting materials, and the inner wall be predominantly of thermoplastic materials, it is another object of this invention to provide a properly dispersed two-constituent plastic casting composition containing thermosetting resins or plastics whose specific gravity is greater than that of the thermoplastic constituents required and which will centrifuge properly to provide a bonded thermoplastic lining. Further, it being desirable that the thermoplastic lining be relatively thin with respect to the main body and outer wall of the cast pipe, another object of the invention is correspondingly to proportion the thermoplastic resin or other plastic material and the thermosetting resin or other plastic material in the dispersed composition.

Other objects and features of the invention will become apparent to those skilled in the art upon reference to the following specification.

In practicing the present invention it is desirable that cast plastic pipe, preferably reinforced as with a fiber glass matted fabric or coarse woven fabric, have a relatively soft, tough, non-cracking, integral inner lining which amounts to at least 5% or around 10% to 25%, more or less, of the wall thickness of the cast pipe. Since a layer of an appropriate plastic material cannot be satisfactorily applied separately as a lining to the main body of plastic material being centrifugally cast, and since thermosetting plastics required for the body and outer wall of the pipe and thermoplastic resins or other plastic materials required for the lining are not properly compatible by ordinary admixture and will not result in a cast product having a sufficiently tenacious bond between the two types of plastics, a different type of composition is required.

I have discovered that thermoplastic resins (which are received in a finely ground or granular condition) may be successfully dispersed in the usual thermosetting resins (which are characteristically liquid) through the medium of an aliphatic carrier liquid or dispersion agent in the form of a volatilizable hydrocarbon liquid or a liquid which enters into the composition of the set product. The thermoplastic material should be of lower specific gravity than the thermosetting material so as to accumulate predominantly at the inner wall of the pipe during centrifugation, whereby to form a relatively soft, tough, non-crackable inner pipe lining. With this procedure there is a sufficiently indistinct line of demarcation or interface between the two constituents in the cast product to insure an adequate bond in conjunction with the reinforcing fibrous material used, such as fiber glass mat.

Thus, I employ a blend or dispersion of a relatively large proportion of a thermosetting resin or similar appropriate plastic and a minor proportion of a thermoplastic resin or similar material of a plastic nature, by first thoroughly coating the ground or granular thermoplastic material with a protective layer of a volatile hydrocarbon such as a kerosene fraction, and then thoroughly distributing the coated thermoplastic in the liquid thermosetting constituent. The hydrocarbon coating and the dispersion of the coated particles in the liquid thermosetting constituent produce a somewhat colloidal, liquid plastic composition which is readily usable in a centrifugal casting operation even where using reinforcing fabrics, which characteristically are sufficiently coarse to pass the coated thermoplastic particles through their interstices, such as glass wool mat. The carrier or colloidal dispersion agent is commonly employed in about 5% by weight of the thermoplastic constituent, but as low as 3% may sometimes be used, or as much as 10% or more may be used. There is no object in using more than enough to be desirably effective, since it must be driven off by heat in the curing step if it is of the hydrocarbon type like kerosene or kerosene diluted with a little mineral spirits, or the like.

As to the plastic constituents for the present purpose, the thermosetting plastic required for the main body and the outer wall of the pipe is required to have a specific gravity sufficiently greater than that of the thermoplastic lining material that sufficient separation will result during centrifugal casting of the pipe product to pass the heavier thermosetting plastic predominantly to the exterior of the pipe and leave an inner lining layer consisting predominantly of the thermoplastic material which is of the lower specific gravity.

In specific instances, I have used as the heavier, thermosetting plastics the well known plastics usable for this purpose, such as the various polyester resins. Some of these are known on the market as "Selectrons" produced by Pittsburgh Plate Glass Co. Others may be those known as "Glidapol," "Laminac," and "Praparaplex." These thermosetting resins may have specific gravities within the range of about 1.18 to about 1.3. In connection with thermoplastic resins for the present purpose, I have used the well known polyethylene resins which fuse around 215° F. Others may be vinylidene chloride unplasticized and prepared nitrile rubbers. Such thermoplastic resins have specific gravities in the range of about 0.97 to about 1.18. Thus, the specific gravity spread between the thermosetting resin used and the thermoplastic resin used could be as much as about 0.3 and preferably should be at least about 0.03. Materials of desirable characteristics having a specific gravity too high for normal use may be swollen with appropriate solvents in order to adjust the specific gravity to suit requirements. Since the proportion of thermoplastic resin to thermosetting resin is not particularly critical, percentages such as previously stated can be calculated on either a weight basis or a volume basis. Since there is a very large number of both types of resins on the market well known to the plastic chemists, any of these of the indicated types may also be used.

Plastic pipe cast centrifugally by procedures herein described is produced and cured and otherwise handled in the same manner as plastic pipe formed from other liquid plastic materials, the product having the advantage that its inner surface is relatively soft, is tough, and does not crack or craze in usage.

The term "resin" when used herein includes various pertinent materials commonly known as "plastics" and capable of being centrifuged, set and cured to produce sufficiently stiff plastic pipe structures as described, where resin mixtures employed have been homogenized.

It is intended to cover all such variations of the generic invention disclosed as are included within the scope of the patent claims.

I claim as my invention:

1. A method for producing centrifugally cast plastic pipe including: dispersing a body of particles of thermoplastic resin, carrying a coating of a dissipating carrier, in a liquid thermosetting resin of different specific gravity of at least 0.03 gravity differential greater than that of the thermoplastic resin; introducing into a cylindrical mold a quantity of such liquid dispersion of thermosetting and thermoplastic resins of different specific gravities; and centrifuging said mixture in said cylindrical mold to yield a partially separated thermoplastic layer constituting one wall of the cast pipe.

2. A method as in claim 1 including heat-curing the cast pipe while undergoing centrifugation.

3. A method for producing cast plastic pipe including the steps of: coating a quantity of thermoplastic resin particles with a minor proportion of a dissipating liquid dispersing agent; dispersing such coated thermoplastic material in a thermosetting liquid plastic resin having greater specific gravity than the specific gravity of the thermoplastic resin, the thermoplastic resin being present between about 5% and 25% of the composition and the thermosetting resin being present between about 95% and 75% of the composition; centrifuging the combined thermoplastic and themosetting resin composition in a mold to produce a pipe; and applying heat to the pipe mold during centrifuging to set the thermosetting resin and yield a pipe whose main body portion and outer wall are predominantly thermosetting resin, and whose inner wall is predominantly thermoplastic resin.

4. A method according to claim 3 wherein the dispersing agent constitutes from about 3% to about 5% of the thermoplastic resin.

5. A method as in claim 5 wherein the specific gravity of the thermoplastic resin lies between about 0.97 and about 1.18 and the specific gravity of the thermosetting resin lies between about 1.18 and 1.3.

6. A method according to claim 5 wherein there is a specific gravity differential of at least 0.03.

7. A method according to claim 3 wherein there is a specific gravity differential of at least 0.03.

8. A method according to claim 3 wherein the thermosetting and thermoplastic resins are compatible and the thermoplastic inner layer bonds with the thermosetting portion of the cast pipe.

9. A method according to claim 6 wherein the thermosetting and thermoplastic resins are compatible and the thermoplastic inner layer bonds with the thermosetting portion of the cast pipe.

10. A method as in claim 3 wherein the dispersion of said coated thermoplastic resin in said liquid thermosetting resin is of colloidal nature.

11. A method according to claim 3 wherein the dispersing agent is kerosene.

References Cited in the file of this patent

UNITED STATES PATENTS

| | | |
|---|---|---|
| 2,385,920 | Jenkins | Oct. 2, 1945 |
| 2,567,719 | Loritsch et al. | Sept. 11, 1951 |

FOREIGN PATENTS

| | | |
|---|---|---|
| 14,490 | Great Britain | Oct. 13, 1916 |
| 381,551 | Great Britain | Sept. 29, 1932 |

UNITED STATES PATENT OFFICE

CERTIFICATE OF CORRECTION

Patent No. 2,887,728                                                      May 26, 1959

Ernest M. Usab

It is hereby certified that error appears in the printed specification of the above numbered patent requiring correction and that the said Letters Patent should read as corrected below.

Column 4, line 25, for the claim reference numeral "5" read -- 3 --.

Signed and sealed this 29th day of September 1959.

(SEAL)
Attest:

KARL H. AXLINE
Attesting Officer

ROBERT C. WATSON
Commissioner of Patents